Aug. 17, 1926.
W. H. MILLSPAUGH
TUBE ROLLING MACHINE
Filed Oct. 24, 1924
1,596,751
2 Sheets-Sheet 1
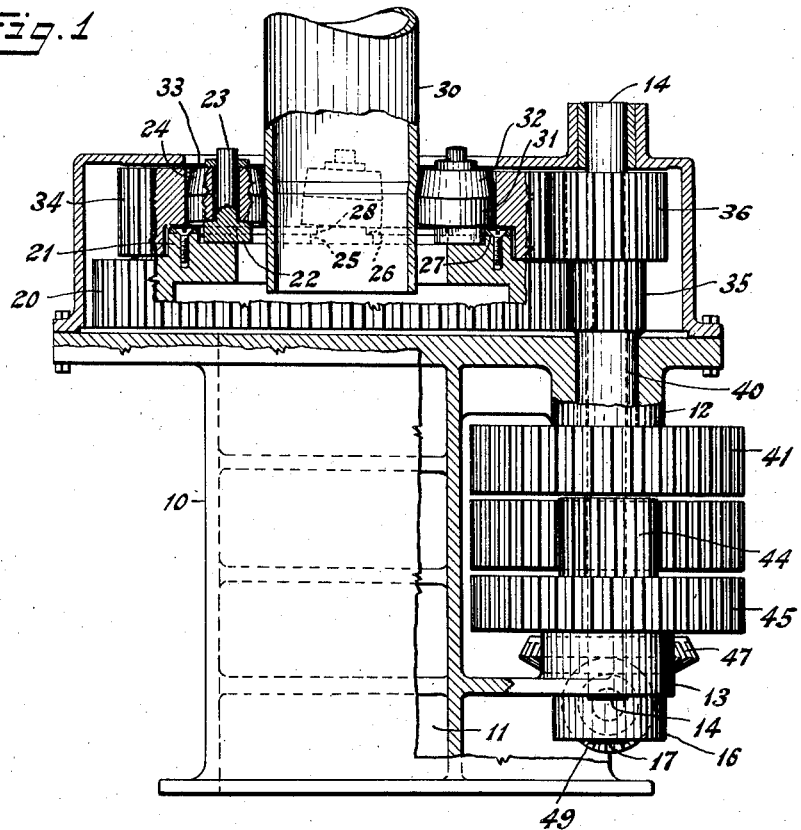
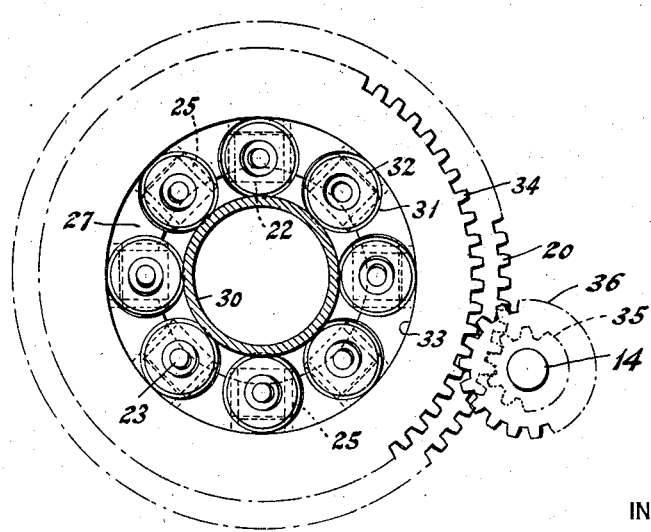
INVENTOR
William H. Millspaugh
BY
Marshall & Hawley
ATTORNEYS Aug. 17, 1926.  
W. H. MILLSPAUGH  
TUBE ROLLING MACHINE  
Filed Oct. 24, 1924  
1,596,751  
2 Sheets-Sheet 2
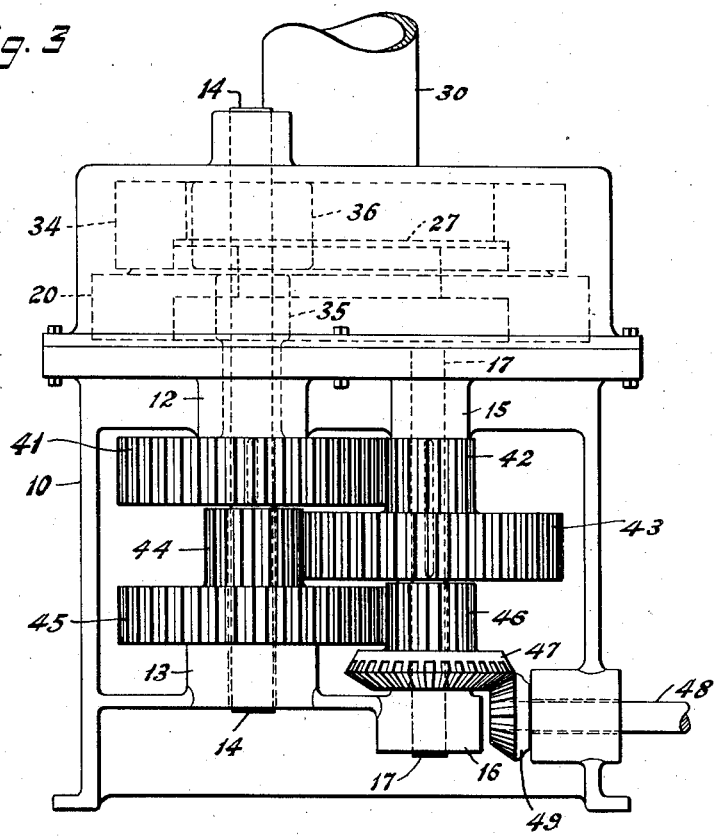
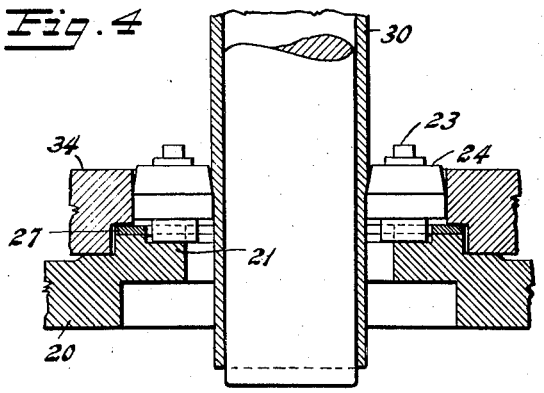
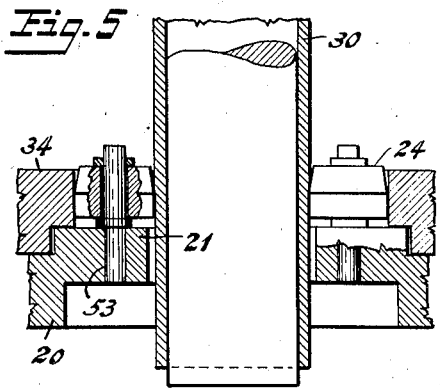
INVENTOR  
*William H. Millspaugh*  
BY  
*Marshall & Hawley*  
ATTORNEYS Patented Aug. 17, 1926.

1,596,751

UNITED STATES PATENT OFFICE.

WILLIAM H. MILLSPAUGH, OF SANDUSKY, OHIO, ASSIGNOR TO THE SANDUSKY FOUNDRY & MACHINE CO., OF SANDUSKY, OHIO, A CORPORATION OF OHIO.

TUBE-ROLLING MACHINE.

Application filed October 24, 1924. Serial No. 745,561.

This invention relates to rolling mechanisms for use in rolling or drawing hollow billets or tubes. In this rolling operation the tubes are elongated, reduced in diameter and increased in density.

One objection to such mechanisms as now constructed is that the tubes or billets during the rolling or drawing operation are often rotated at high speeds, causing "whipping" of the tube and interfering with the proper execution of the operation.

One of the objects of the invention is to provide a machine so constructed and arranged that the rotation of the tube operated upon can be controlled or eliminated through eliminating "whipping" of the tube.

Another object of the invention is to provide a machine of the character described adapted to operate on tubes or billets of different diameters.

Further objects of the invention will appear from the following specification taken in connection with the drawings, which form a part of this application, and in which Fig. 1 is an elevational view partly in section of the machine constructed in accordance with the invention.

Fig. 2 is a top plan view of the construction shown in Fig. 1 parts being omitted for the sake of clearness.

Fig. 3 is an elevational view taken at right angles to Fig. 1.

Fig. 4 is a sectional elevation broken away showing a tube having an arbor therein passing through the machine, and Fig. 5 is a sectional elevation showing a slightly modified form of construction of the roller mounting.

The invention briefly described consists of a machine comprising a rotatable member or gear having mounted thereon for rotation therewith, a plurality of rollers disposed around the axis of rotation of the member. The rollers are frictionally driven by contact with a second rotatable member or gear. The gear which carries the rollers in a circumferential path is preferably driven at a slower speed than the gear which frictionally engages and rotates the rollers on their respective axes. The axes of the rollers on which the rollers are loosely mounted may be inclined to the axes of rotation of the rotatable members or gears in such a manner as to feed the tube or billet through the machine or if desired, these axes may be vertical and the work may be fed through the machine by pressure. The roller axes moreover may be slidably mounted on the gear by which they are carried thus adapting the rollers for use on work of different sizes and with frictional driving gears having different internal diameters. Further details of the invention will appear from the following description.

The particular embodiment of the invention illustrated consists of a machine comprising a base 10 having a hollow passage 11 therethrough to receive the tube or billet being rotated. The base also has bearings 12 and 13 for a shaft 14 and bearings 15 and 16 for a shaft 17.

A gear 20 is mounted above the base and has an upward extending portion 21 in which are slidably mounted heads or flanges 22 formed on pins 23 on which are supported rollers 24. As shown in Fig. 2, the portion 21 of the gear 20 has formed therein radial slots 25 for receiving the heads 22 of the pins 23 and the heads as shown in Fig. 1 are flanged as shown at 26. The flanges 26 are positioned beneath a ring or disk 27 which is also provided with radial slots so dimensioned as to receive the reduced portion 28 of the head 22. It will thus be seen that the heads 22 and pins 23 are slidable radially on the gear 20. By reason of the slidable mounting of the pins and heads, sets of rollers 24 of different diameters can be used for different sizes of work. For instance, if a tube or billet of a smaller diameter than that illustrated is to be rolled, a set of rollers 24 having a greater diameter would be mounted on the pins 23.

In the particular form of the invention shown in Figs. 1 to 3 inclusive, the pins 23 are inclined with respect to the axes of rotation of the gear 20 in order to feed the tube or billet 30 through the machine. These pins may however, be disposed vertically as shown in Figs. 4 and 5 or parallel to the axes of rotation of the gear 20. Each of the rollers 24 has a cylindrical portion 31 and a conical portion 32. The cylindrical portion of each of the rollers frictionally engages the inner cylindrical surface 33 of a gear 34.

The gear 20 is driven by a gear 35 rotatably mounted on the shaft 14 and the gear 34 is driven by a gear 36 also mounted on the shaft 14 and fixed with respect to the gear 35.

In the form of the invention illustrated, the gearing is so arranged as to drive the gear 20 at a slower speed than the gear 34 and this is preferable.

The gear 35 is mounted on a sleeve 40 on which there is also mounted a gear 41, these two gears being rotatable at the same speed. The gear 41 is driven by a gear 42 rotatably mounted on the shaft 17 and this gear is driven by a gear 43 integral with gear 42, gear 43 is driven by a gear 44 on the shaft 14. The gear 44 is integral with and is driven by a gear 45 rotatable on the shaft 14 and the gear 45 is driven by a gear 46 rotatably mounted on the shaft 17. Gear 46 is integral with and is driven by a beveled gear 47 rotatably mounted on the shaft 17. Gear 47 is driven from a driving shaft 48 through a beveled gear 49. It will be understood that any other form of gearing may be used if desired and that the form illustrated has been shown merely for the purpose of showing one practical form of driving mechanism.

In Fig. 5 the roller pins 53 are fixedly mounted in the gear 20 and are disposed vertically instead of being slidably mounted on this gear and being inclined to the axes of rotation of the gear. With the form of construction shown in Figs. 4 and 5 the work is fed through the machine by pressure.

The structure above described operates as follows:

In Fig. 1 a tube or hollow billet is shown as passing through the machine without an arbor. This operation reduces the diameter of the tube and elongates the tube but effects a very slight change in the thickness of the wall of the tube. In Fig. 4 a tube is passed through the machine with an arbor disposed therein. When the tube is disposed as shown in Figs. 1 and 4 and the shaft 48 is driven, the gears 20 and 34 will be rotated at different speeds, the gear 20 being preferably rotated at a slower speed than the frictional driving gear 34. The rotation of the gear 20 will carry the rollers bodily around the axes of rotation of the gear and around the work 30 and the frictional engagement of the rollers 24 with the surface 33 of the gear 34 will rotate these rollers on their axes. When the axes or pins 23 of the rollers are inclined as shown in Fig. 1, the operation of the rollers on the work will cause the work to be fed through the machine. By means of the differentiation in the speed of rotation of the gears 20 and 34 the rotation of the work 30 as it passes through the machine can be controlled and can be entirely eliminated if desired.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In a tube rolling mechanism a rotatable member having a central opening therethrough to receive the tube to be rolled, a plurality of rollers mounted thereon and spaced equal distances from the axis of rotation of said member, a second rotatable member frictionally engaging said rollers, and means for driving said rotatable members at different speeds.

2. In a tube rolling mechanism a rotatable member, a plurality of rollers mounted thereon and spaced equal distances from the axis of rotation of said member, a second rotatable member surrounding and frictionally engaging said rollers, and means for driving said rotatable members; the first member being driven at a slower speed than the second member.

3. In a tube rolling mechanism a rotatable member, a plurality of rollers radially mounted thereon and spaced equal distances from the axis of rotation of said member, a second rotatable member surrounding and frictionally engaging said rollers, and means for driving said rotatable members at different speeds.

4. In a tube rolling mechanism a rotatable member, a plurality of rollers movably mounted thereon and spaced equal distances from the axis of rotation of said member, a second rotatable member frictionally engaging said rollers, and means for driving said rotatable members at different speeds.

5. In a tube rolling mechanism a rotatable member, a plurality of rollers slidably mounted thereon and spaced equal distances from the axis of rotation of said member, a second rotatable member frictionally engaging said rollers, and means for driving said rotatable members at different speeds.

6. In a tube rolling mechanism a rotatable member, a plurality of rollers mounted thereon on axes inclined to the axis of rotation of the member and spaced equal distances from the axes of rotation of said member, a second rotatable member frictionally engaging said rollers, and means for driving said rotatable members at different speeds.

7. In a tube rolling mechanism a rotatable member, a plurality of rollers slidably mounted thereon on axes inclined to the axis of rotation of the member and spaced equal distances from the axes of rotation of said member, a second rotatable member frictionally engaging said rollers, and means for driving said rotatable members at different speeds.

8. In a tube rolling mechanism a gear, a plurality of rollers mounted thereon, each roller having a cylindrical portion and tapered portion, a second gear having an annular surface engaging the cylindrical portions of said rollers and means for driving said gears, said means being constructed and arranged to drive the first named gear at a slower speed than the second named gear.

9. In a tube rolling machine a gear having a supporting surface, a plurality of rollers radially disposed and slidably mounted on said surface, a second gear having an annular surface adapted to frictionally engage and rotate said rollers and means for driving said gears, said means being constructed and arranged to drive the first named gear at a slower speed than the second named gear.

10. In a tube rolling mechanism, a support having an opening therethrough adapted to receive a tube or billet, a rotatable member mounted on the support and having an opening alinged with the opening therein, a plurality of rollers mounted on said member and spaced from the axis thereof to form a central opening to receive the tube or billet, said rollers having substantially cylindrical portions, means for driving said rotatable member and friction driving means engaging the cylindrical portions of the rollers at points diametrically opposite to the points of engagement of the rollers with the tube or billet for rotating said rollers on their axis.

11. In a tube rolling mechanism a support having an opening therethrough adapted to receive a tube or billet, a rotatable member mounted on the support and having an opening alined with the opening therein, a plurality of rollers rotatably and slidably mounted on said member and spaced from the axis thereof to form a central opening to receive the tube or billet, means for driving said rotatable member and means surrounding the rollers for rotating said rollers on their axes.

12. In a tube rolling mechanism, a support having an opening therethrough adapted to receive a tube or billet, a rotatable member mounted on the support and having an opening alined with the opening therein, a plurality of rollers mounted on said member and spaced from the axis thereof to form a central opening to receive the tube or billet, said rollers having substantially cylindrical portions, means for driving said rotatable member and means surroundng and frictionally engaging the rollers for rotating said rollers on their axes, said means engaging the cylindrical portions of the rollers at points diametrically opposite to the points of engagement of the rollers with the tube or billet.

In witness whereof, I have hereunto set my hand this 14th day of October, 1924.

WILLIAM H. MILLSPAUGH.